(12) United States Patent
Rai et al.

(10) Patent No.: US 10,034,038 B2
(45) Date of Patent: Jul. 24, 2018

(54) VIDEO CHANNEL SELECTION

(71) Applicant: Cisco Technology, Inc., San Jose, CA (US)

(72) Inventors: Pete Rai, Egham (GB); Eynav Cohen, Modiin (IL); Ronnie Dan, Modiin (IL); Ahuva Levkowitz, Jerusalem (IL); Tal Maoz, Jerusalem (IL); Aviva Vaknin, Jerusalem (IL); Reuven Wachtfogel, Elazar (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 51 days.

(21) Appl. No.: 14/716,929

(22) Filed: May 20, 2015

(65) Prior Publication Data
US 2016/0073170 A1    Mar. 10, 2016

Related U.S. Application Data

(60) Provisional application No. 62/048,274, filed on Sep. 10, 2014.

(51) Int. Cl.
*H04N 21/431* (2011.01)
*H04N 21/482* (2011.01)
(Continued)

(52) U.S. Cl.
CPC ..... *H04N 21/4312* (2013.01); *G06K 9/00228* (2013.01); *H04N 21/237* (2013.01); *H04N 21/23418* (2013.01); *H04N 21/26603* (2013.01); *H04N 21/4126* (2013.01); *H04N 21/42224* (2013.01); *H04N 21/431* (2013.01); *H04N 21/4314* (2013.01); *H04N 21/4316* (2013.01); *H04N 21/44008* (2013.01); *H04N 21/472* (2013.01); *H04N 21/482* (2013.01); *H04N 21/8153* (2013.01); *H04N 21/2221* (2013.01); *H04N 21/4383* (2013.01)

(58) Field of Classification Search
CPC ....... H04N 21/23418; H04N 21/26603; H04N 21/431; H04N 21/4312; H04N 21/4314; H04N 21/472; H04N 21/482
See application file for complete search history.

(56) References Cited

U.S. PATENT DOCUMENTS

| | | | |
|---|---|---|---|
| 6,938,208 | B2 | 8/2005 | Reichardt |
| 7,840,980 | B2 | 11/2010 | Gutta |

(Continued)

OTHER PUBLICATIONS

Choi, Jae Young, et al; "Towards an automatic face indexing system for actor-based video services in an IPTV environment", in Consumer Electronics, IEEE Transactions on 56, No. 1 (2010): 147-155.

*Primary Examiner* — Jeremy S Duffield
(74) *Attorney, Agent, or Firm* — Polsinelli PC (57) ABSTRACT

In one embodiment, a method for selecting video channels is implemented on a computing device and includes: presenting at least one set of detected facial images, detecting user selection of a selected set of detected facial images, where each of the at least one set is associated with one of the video channels; and sending a video channel switching command to a video channel playing device, where the video channel switching command indicates a switch to the video channel associated with the selected set of detected facial images.

13 Claims, 6 Drawing Sheets

(51) Int. Cl.
*H04N 21/237* (2011.01)
*H04N 21/44* (2011.01)
*H04N 21/81* (2011.01)
*G06K 9/00* (2006.01)
*H04N 21/266* (2011.01)
*H04N 21/472* (2011.01)
*H04N 21/234* (2011.01)
*H04N 21/41* (2011.01)
*H04N 21/422* (2011.01)
*H04N 21/438* (2011.01)
*H04N 21/222* (2011.01)

(56) References Cited

U.S. PATENT DOCUMENTS

| | | | |
|---|---|---|---|
| 7,986,372 B2 | 7/2011 | Ma et al. | |
| 8,732,149 B2 | 5/2014 | Iida et al. | |
| 9,003,445 B1* | 4/2015 | Rowe | H04N 21/26283 725/37 |
| 2001/0030661 A1* | 10/2001 | Reichardt | H04N 21/482 715/721 |
| 2003/0068087 A1 | 4/2003 | Wu et al. | |
| 2005/0048916 A1* | 3/2005 | Suh | H04N 21/8153 455/39 |
| 2009/0089822 A1* | 4/2009 | Wada | G06F 17/30781 725/10 |
| 2010/0095327 A1* | 4/2010 | Fujinaka | H04N 21/4263 725/41 |
| 2010/0215334 A1* | 8/2010 | Miyagi | H04N 21/84 386/287 |
| 2010/0275164 A1* | 10/2010 | Morikawa | H04N 21/431 715/838 |
| 2012/0308202 A1* | 12/2012 | Murata | H04N 21/4316 386/241 |
| 2012/0313971 A1* | 12/2012 | Murata | H04N 21/44008 345/660 |
| 2012/0324512 A1* | 12/2012 | Cahnbley | H04N 21/4113 725/53 |
| 2013/0124551 A1 | 5/2013 | Foo | |
| 2014/0195557 A1 | 7/2014 | Oztaskent et al. | |
| 2015/0082350 A1* | 3/2015 | Ogasawara | H04N 21/4314 725/44 |
| 2015/0373414 A1* | 12/2015 | Kinoshita | H04N 21/47205 386/282 |

* cited by examiner

VIDEO CHANNEL SELECTION

RELATED APPLICATION INFORMATION

The present application claims the benefit of priority from U.S. Provisional Patent Application Ser. No. 62/048,274, filed on Sep. 10, 2014.

FIELD OF THE INVENTION

The present invention generally relates to the selection of video program channels according to facial images detected in associated video content.

BACKGROUND OF THE INVENTION

U.S. patent application Ser. No. 14/686,798 (hereinafter the '798 application), filed Apr. 15, 2015 and entitled DUPLICATE REDUCTION FOR FACE DETECTION, is assigned to the common assignees of the present invention. The '798 application discloses a system and process providing an entropy-reducing solution for face detection in a video broadcast environment, thereby generating more ordered, qualified and quality facial images for further processing by downstream applications.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method for selecting video channels is implemented on a computing device and includes: presenting at least one set of detected facial images, detecting user selection of a selected set of detected facial images where each of the at least one set is associated with one of the video channels; and sending a video channel switching command to a video channel playing device, where the video channel switching command indicates a switch to the video channel associated with the selected set of detected facial images.

DETAILED DESCRIPTION OF EXAMPLE EMBODIMENTS

Electronic program guides (EPGs) are commonly used by viewers of broadcast television to select a current video channel from among a selection of available video channels. An EPG typically comprises a grid of information that presents the different programming available on a per video channel/time slot basis. The grid typically comprises at least some textual information and/or graphics that describes each potential video channel selection. The inventors of the present invention have realized that facial images detected from among video streams such as those provided by the '798 application may be leveraged to provide an alternate to the typical EPG format by presenting a stream of facial images detected in currently available video programming, and enabling the user to select available programming according to associated facial images.

Figure 1:
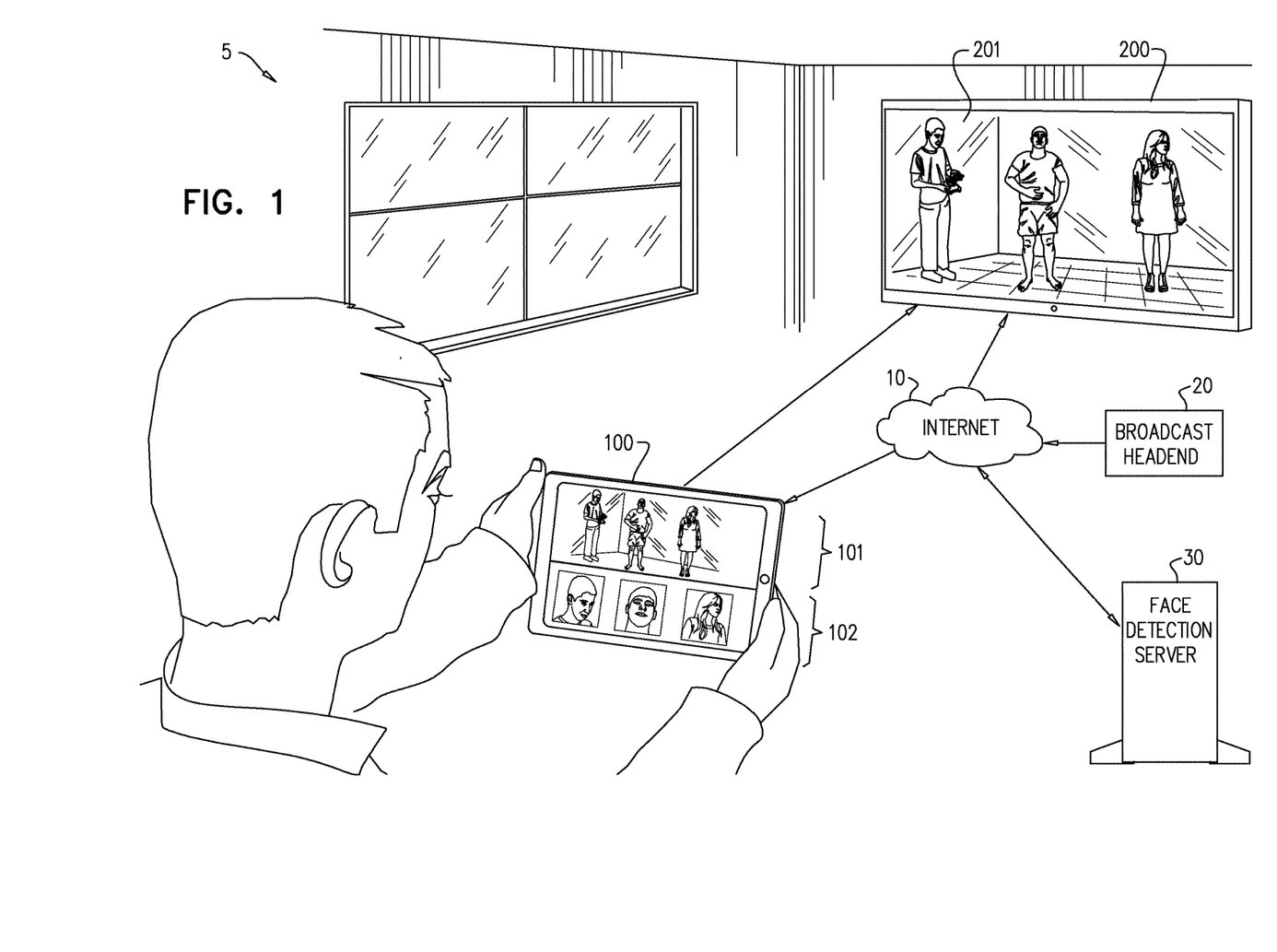
FIG. 1 is a simplified pictorial illustration of a facial image based system for broadcast channel selection, constructed and operative in accordance with embodiments of the present invention.

Reference is now made to FIG. 1 which is a simplified pictorial illustration of a facial image based system for broadcast channel selection 5, constructed and operative in accordance with embodiments of the present invention. System 5 comprises broadcast headend 20 and face detection server 30. It will be appreciated that the depiction of headend 20 and face detection server 30 as separate components of system 5 may be exemplary. The present invention may also support the integration of face detection server 30 as a component of headend 20.

System 5 may also comprise companion device 100 and primary device 200. Companion device 100 may be implemented using any suitable computing device, such as, for example, a personal computer, tablet computer, smartphone or laptop computer. Primary device 200 may be implemented using a video display device such as a television or computer monitor in combination with any suitable computing device, such as, for example, a set-top box, a personal computer, tablet computer, smartphone or laptop computer. Broadcast headend 20 and face detection server 30 may communicate with companion device 100, primary device 200, and/or each other via a communications network 10, such as, for example, the Internet and/or cable/satellite based broadcast systems.

Broadcast headend 20 may broadcast a multiplicity of video channels to primary device 200, each video channel representing a broadcast stream of video programming. Broadcast headend 20 may also broadcast some or all of the multiplicity of video channels to companion device 100. Alternatively, or in addition, companion device 100 may be configured to receive broadcasted video channels from primary device 100.

Face detection server 30 may be operative to detect facial images in video using any suitable method, for example, but not limited to, a method disclosed in the '798 application. It will be appreciated that the method disclosed in the '798 application provides both face detection as well as and the filtering of duplicate facial images from among those detected by the face detection. It will be appreciated by a person of skill in the art that the processes described herein may generally be performed more efficiently if face detection server 30 (or an analogous system component) is configured to filter duplicate facial images. However, depending on the functional requirements, the processes described herein may also be configured to perform in generally the same manner as described without such filtering.

Face detection server 30 may transmit detected facial images along with associated timeline metadata to companion device 100 via network 10. Alternatively, or in addition, face detection server 30 may provide the facial images and associated timeline metadata to broadcast headend 20 for broadcast along with the multiplicity of video channels to either primary device 200 and/or companion device 100. Companion device 100 may also be configured to receive the facial images from either broadcast headend 20 and/or primary device 200. It will be appreciated that the associated timeline metadata may be suitable for aligning the detected facial images temporally with their respective source video.

Primary device 200 may be a video playing device operative to play the video associated with a given video channel generally as it is received (and decoded as necessary) from broadcast headend 20. For example, as shown in FIG. 1, primary video display 201 shows an exemplary scene being played from one of the video channels received from broadcast headend 20.

The display area for companion device 100 may comprise two panels: companion video display 101 and facial images display 102. Companion display 100 may be operative to play one of the video channels received (either directly or indirectly) from broadcast headend 20 in companion video display 101. It will be appreciated that companion device 100 may be tuned to the same video channel as primary device 200, such that the same video content may be played in parallel on displays 101 and 201. It will also be appreciated that the playing of video on either companion device 100 and/or primary device 200 may also include the playing of audio in addition to the exemplary video images depicted in FIG. 1.

As will be described hereinbelow, companion device 100 may use facial images display 102 to show facial images associated with video channels, as per the timeline metadata received from face detection server 30. For example, the facial images depicted in facial images display 102 may correspond to those of the characters depicted in companion video display 101 and primary video display 201. A viewing user may scroll through the facial images in facial images display 102, where each successive row of facial images may be associated via its timeline metadata to a different video channel currently being broadcast by broadcast headend 20. The viewing user may select from among these facial images to control the video content to be played on primary video display 201 and companion video display 101.

It will be appreciated that the rows of facial images may be used analogously to program entries in a conventional EPG in order to access other functionality. For example, the viewing user may also select to record the video content currently playing on the associated video channel, live pause the broadcast, and/or order the video content via video on demand (VOD).

Figure 2:
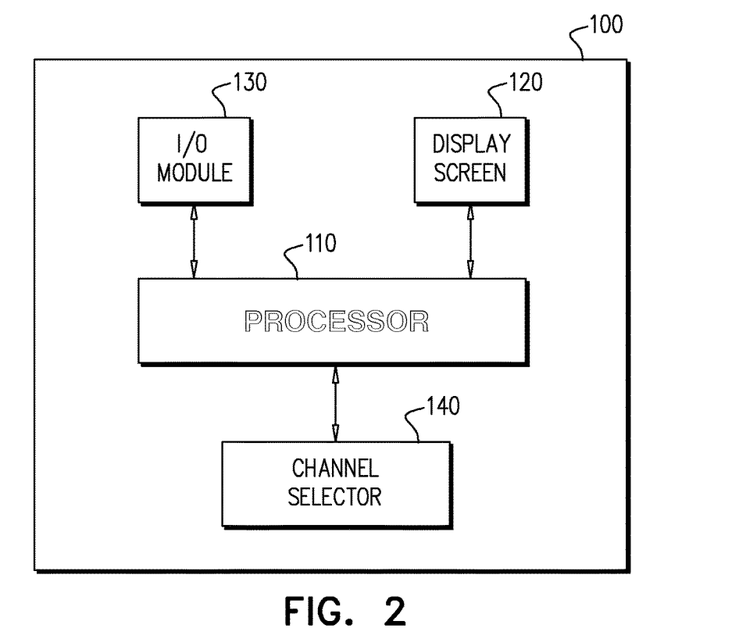
FIG. 2 is a schematic illustration of an exemplary companion device of the system of FIG. 1.

Reference is now also made to FIG. 2, which is a schematic illustration of an exemplary companion device 100. Companion device 100 comprises hardware and software components, such as are well-known in the art. Companion device 100 also comprises at least one processor 110, I/O module 130, display screen 120 and channel selector 140. It will be appreciated that companion device 100 may comprise other components that are not depicted in FIG. 2.

It will be appreciated that companion device 100 may comprise more than one processor 110. For example, one such processor 110 may be a special purpose processor operative to execute channel selector 140 to format and present video content and/or facial images on display screen 120, and to select video channels on primary device 200 according to a method described herein. Channel selector 140 may be implemented in software and/or hardware. Display screen 120 may be any suitable display screen operative to display companion video display 101 and facial images display 102. Display screen 120 may also be a touchscreen operative to detect contact and/or patterns of contact that may be interpreted as commands by a user of companion device 100. I/O module 130 may be operative to provide communication between channel selector 140 on companion device 100 and primary device 200, broadcast headend 20 and/or face detection server 30. A non-limiting example of I/O module 230 may be a transceiver.

Figure 3:
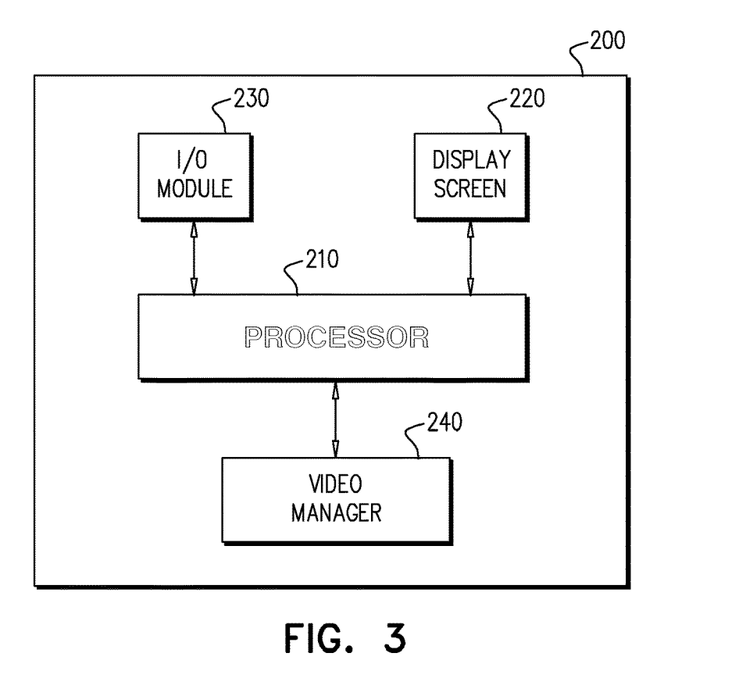
FIG. 3 is a schematic illustration of an exemplary primary device of the system of FIG. 1.

Reference is now also made to FIG. 3, which is a schematic illustration of an exemplary primary device 200. Primary device 200 comprises hardware and software components, such as are well-known in the art. Primary device 200 also comprises at least one processor 210, I/O module 230, video display screen 220 and video manager 240. It will be appreciated that primary device 200 may comprise other components that are not depicted in FIG. 3.

It will be appreciated that companion device 100 may comprise more than one processor 210. For example, one such processor 210 may be a special purpose processor operative to execute video manager 240 to format and present video content on video display screen 220, and to select video channels per commands received from companion device 100 according to a method described herein. Video manager 140 may be implemented in software and/or hardware. Video display screen 220 may be any suitable display screen such as that of a television, computer monitor, or built-in computer screen.

I/O module 230 may be any hardware or software component operative to use protocols such as are known in the art to receive video content from broadcast headend 20. I/O module 230 may be operative to receive commands and/or media content from companion device 100 and/or broadcast headend 20. A non-limiting example of I/O module 230 may be a transceiver.

Figure 4:
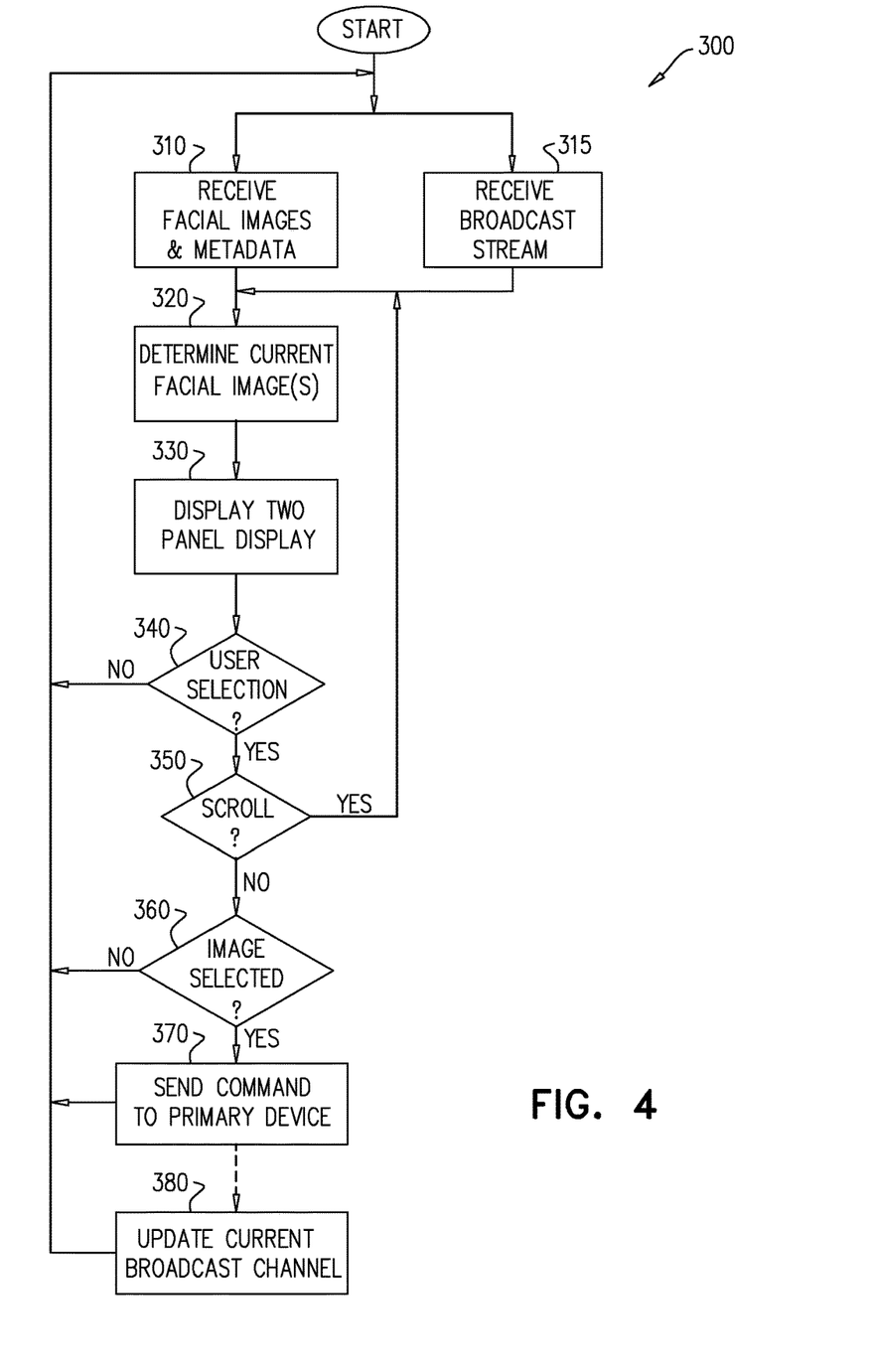
FIG. 4 is a block diagram of a process to be performed by the companion device of FIG. 2.

Reference is now made also to FIG. 4 which illustrates a facial image based video channel selection process 300 to be performed by channel selector 140 on companion device 100. Channel selector 140 may receive (step 310) facial images and metadata from face detection server 30 (FIG. 1). Generally in parallel, channel selector 140 may also receive (step 315) a broadcast stream including at least one video channel, i.e. the video channel to which primary device 200 is currently tuned and is playing on primary video display 201. Alternatively, companion device may be configured not to receive the broadcast stream.

Channel selector 140 may use the timeline metadata received with the facial images to determine (step 320) one or more generally current facial images to be associated with each of the video channels currently being broadcasted by broadcast headend 20. It will be appreciated that the number of current facial images may be, at least in part, a function of the number of facial images present and detectable in the broadcast stream. It will also be appreciated that there may be no current facial images associated with a given video channel. For example, the video channel may be presenting video content without discernable human facial images, e.g., video content with animals, or a science fiction movie with alien characters.

It will similarly be appreciated that the number of current facial images may be limited in the interests of not cluttering the display on facial images display 102 as shown in FIG. 1. For example, channel selector 140 may be configured to limit the maximum number of current facial images to two, three, four, etc. Therefore, if currently broadcasted video content on a given video channel includes more than the maximum number of detected images, the current facial images as determined by channel selector 140 may not include all of the candidate facial images, i.e. the facial images associated with the given video channel. In such a case, the determination of which candidate facial images are designated as current may be based on continuity of appearance, i.e. if facial images A, B and C were recently determined to be current facial images for a given video channel, then they will be prioritized vis-à-vis facial image D which was not previously determined to be current. Alternatively, the determination may prioritize newer candidate facial images, in which case, facial image D may be prioritized vis-à-vis facial images A, B and C.

Alternatively, the determination may be configured to be based on frequency, or lack of frequency, of appearance. In such a case, for example, prioritization may be based on how often a given candidate facial image appeared previously over X minutes, where X is configurable. Alternatively, or in addition, the prioritization may be based on user preferences based on historical video channel selections on companion device 100 and/or user input. Alternatively, or in addition, the prioritization may be based on overall audience viewing preferences as input/configured/determined by broadcast headend 20 and/or face detection server 30 and provided thereinafter to companion device 100. Alternatively, or in addition, channel selector 140 may be configured to maximize rotation of the candidate facial images as current facial images in order to increase the likelihood that the viewer will see an increased number of facial images over time. Alternatively, or in addition, prioritization may be based at least in part on randomization.

Alternatively, the timeline metadata provided by face detection server 30 may include an indication regarding the significance of the person represented by a given facial image. For example, face detection server 30 may be configured with facial recognition functionality, i.e., configured to determine that a given detected facial image matches (to some degree of certainty) a reference facial image for a known person. Such functionality would enable face detection server 30 (or another suitably configured system component) to identify the persons associated with given detected facial images, and using the associated timeline metadata, establish their role in the video content. Channel selector 140 may therefore be configured to prioritize roles for designation as current facial images, e.g. leading actors/actresses vis-à-vis supporting actresses, news anchors vis-à-vis field reporters, etc. It will, in any case, be appreciated that randomization may be used as an arbiter when any of the alternatives are insufficient to otherwise precisely determine which candidate facial images are to be designated as current.

In accordance with some embodiments, instead of, or in addition to, channel selector 140, face detection server 30 may also be configured to perform steps 310 and/or steps 320 and provide the results to channel selector 140 to facilitate continued processing of process 300.

It will also be appreciated that the facial images and metadata received in steps 310 and the broadcast stream received in 315 may not necessarily be synchronized at the time of receipt. For example, if face detection server is configured to capture the broadcast stream as it is broadcasted to end users, there may be latency with regard to the timing of the detected facial images, i.e. companion device 200 may receive the facial images sometime after the video content in which they were detected has been broadcast. Conversely, sometimes video content, particularly live video content, is broadcast with a delay, for example, six seconds. In such a case, companion device 100 may receive the facial images in advance of the associated broadcast stream. Channel selector 140 may therefore use the associated timeline metadata to synchronize (to the extent possible) the facial images with the actual broadcast.

Channel selector 140 may display (step 330) a two panel display on display screen 120. The top panel may display the current video channel playing in companion video display 101, and the bottom panel may comprise a current set of facial images associated with a video channel on facial images display 102. It will be appreciated that the current video channel to be displayed in companion video display 101 may be dependent on the current video channel playing on primary video display 201. It will also be appreciated that the current set of facial images may initially default to that associated with the current video channel playing in companion video display 101. It will further be appreciated that the representation of top and bottom panels in FIG. 1 may be exemplary; the present invention may also support a side by side configuration. Similarly, the orientation may change if companion device 100 is rotated. It will similarly be appreciated that the present invention may also support a single panel display where only the current facial images are displayed, i.e. companion video display 101 may not be presented on companion device 100. Alternatively, the current facial images may be displayed superimposed over the current video channel in a single panel representation. It will be appreciated that previously displayed facial images may be replaced singly or in groups as steps 320 and 330 are repeated. Current facial images may "time out", for example after thirty seconds or a minute. Timed out facial images are not displayed in step 330, and they may or may not be replaced in the display by new current facial images as determined in step 320. Previously displayed current facial images may also be replaced before timing out by newer current facial images.

It will be appreciated that once process 300 has started, companion device 100 may typically receive a continuing stream of facial images, timeline metadata and/or broadcast video. If no user selection is detected (step 340), the process may therefore loop back to steps 310 and 315.

If a user selection is detected (step 340), process 300 may process the selection. It will be appreciated that user selections may typically be entered via user interface (UI) gestures detected by display screen 120. It will also be appreciated that the present invention may support other methods for the entry of user selection, including, for example, voice commands and/or mouse selections.

If the user selection is a scroll request (step 350), control may return to step 320 to determine a new set of facial images to display in step 330. It will be appreciated that this new set of current facial images may be associated with a different video channel than a previous set, depending on the direction of the scroll. In a touchscreen environment, i.e. where display screen 120 is a touchscreen, a scroll command may be entered by briefly tugging the area of the row of facial images upwards or downwards. When using a mouse, a scroll bar may be manipulated, tugged and/or dragged. For voice command activation, the words "[scroll] up" or "[scroll] down" may be used (where the word "scroll" in brackets may be optional), for example.

If an image is selected (step 360), channel selector 140 may send (step 370) a command to primary device 200. Non-limiting examples of such commands may include facial image selection or channel selection. For example, if a short tap on a facial image is detected, channel selector may send a command to primary device 200 to include a display of the selected facial image superimposed on primary video display 201. If a long press or double tap is detected, channel selector may send a command to primary device 200 to change the current video channel on primary device 200 to the video channel associated with the current set of facial images on companion device 100. It will be appreciated that voice or mouse inputs for channel change commands may also be supported by the present invention. After the command is sent to primary device 200, process 300 may loop back to steps 310 and 315.

It will be appreciated that primary device 200 may be configured to change its current video channel in accordance with commands received from companion device 100. It will similarly be appreciated that both companion device 100 and primary device 200 may be configured with any necessary software and/or hardware that may be required in order to facilitate user control of primary device 200 via inputs to companion device 100. For example, I/O modules 130 and 230 may be configured to provide communication between companion device 100 and primary device 200 over a home network, infra-red. Bluetooth, WiFi and/or a combination thereof.

It will be appreciated that constant determining of the current facial images (step 320) and subsequent display of a new current facial images in facial images display 102 (step 330) may be distracting or confusing for a viewing user. Accordingly, the rate at which the current facial images are determined and displayed (steps 330) may be configurable. For example, process 300 may be configured to perform steps 320 and 330 periodically, e.g. once every second, two seconds, five seconds, etc.

It will also be appreciated that broadcast video content may typically be comprised of primary video content and interstitial video content. EPGs typically list primary video content, i.e., the television programs that are being broadcast. Interstitial video content, i.e., promotional announcements, news updates, and the like, is typically broadcast during breaks between segments of primary video content and/or in parallel with primary video content. It will be appreciated that viewing users may not be interested in selecting video channels in accordance with facial images that are associated with interstitial video content, even if the interstitial video content is currently being broadcast on a given video channel. Accordingly, channel selector 140 may be configured to use the associated timeline metadata to filter out facial images from interstitial video content. In such cases, video channel 140 may be configured to use a most recently determined set of facial images as the current set until after the interstitial video content ends. An indication may also be added to the display in facial images display 102 to alert the viewing user that the associated video channel is currently showing interstitial video content. Alternatively, or in addition, face detector server 30 may be configured to use the associated timeline metadata to filter out facial images from interstitial video content.

It is also appreciated that the present invention may also be implemented entirely on primary device 200, without companion device 100. Primary device 200 may be configured to execute process 300, and facial images display 102 may be included as part of, or instead of, primary video display 201. Commands to select programming in accordance with the facial images may be entered using a remote control or pointing device. In such a case, process 300 may continue to step 380 from step 370 and update (step 380) the current broadcast video channel to be played on primary device 200. Control may then loop back to steps 310 and 315.

In accordance with embodiments of the present invention, in response to a scroll command such as detected in step 350, channel selector 140 may be configured to scroll one or more sets of facial images from facial images display 102 upward over companion video display 101, such that of the current facial images may be superimposed on top of companion video display 101. When a given set of current facial images is displayed on top of companion video display 101, it may be considered to be active, such that it may be possible to issue commands for the associated video channel as per step 370. When channel selector 140 is so configured, it may not be possible to issue commands by user selection for video channels associated with a set of facial images displayed in facial images display 101.

Channel selector 140 may also be configured to send a copy of currently active current facial images to primary device 200. Video manager 240 (FIG. 3) may be configured to superimpose a display of the currently active current facial images on top of primary video display 201, such that the viewing user may have a clearer view of the images for selection. Channel selector 140 may also be configured to send a copy of the timeline metadata associated with the currently active set of facial images to primary device 200. In accordance with some embodiments, primary device 200 may be configured to use the displayed current facial images to enable the user to select the associated video channel to play and/or to request additional information about the associated video channel as per the associated timeline metadata.

Figure 5:
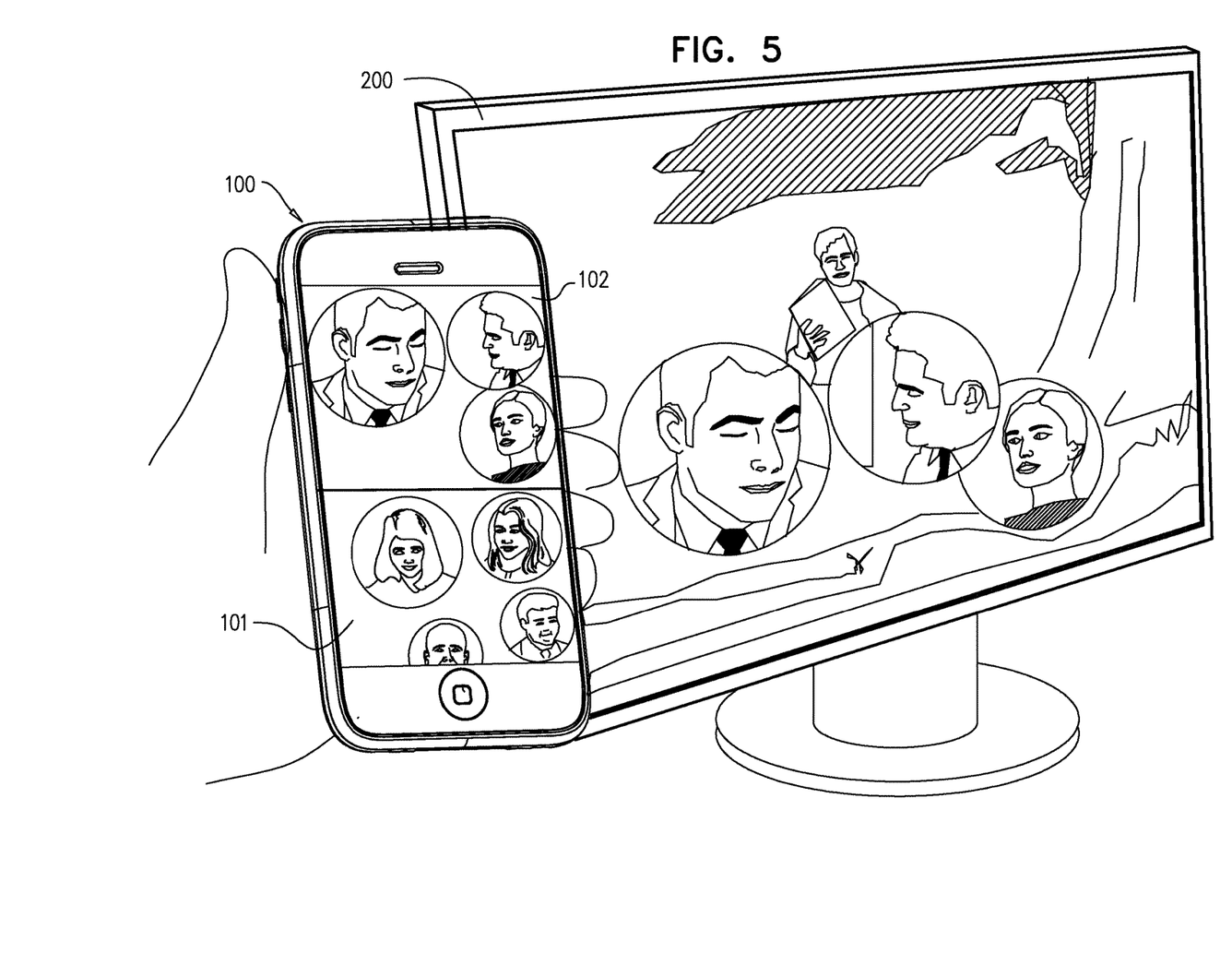
FIGS. 5-7 are simplified pictorial illustrations of exemplary embodiments of the system of FIG. 1.

FIG. 5, to which reference is now made, depicts an exemplary scenario in which the user of device 100 has already activated a set of current facial images by scrolling them from display 102 to display 101. Video manager 240 has received the set from companion device 100 and superimposed the set on top of primary video display 201.

Figure 6:
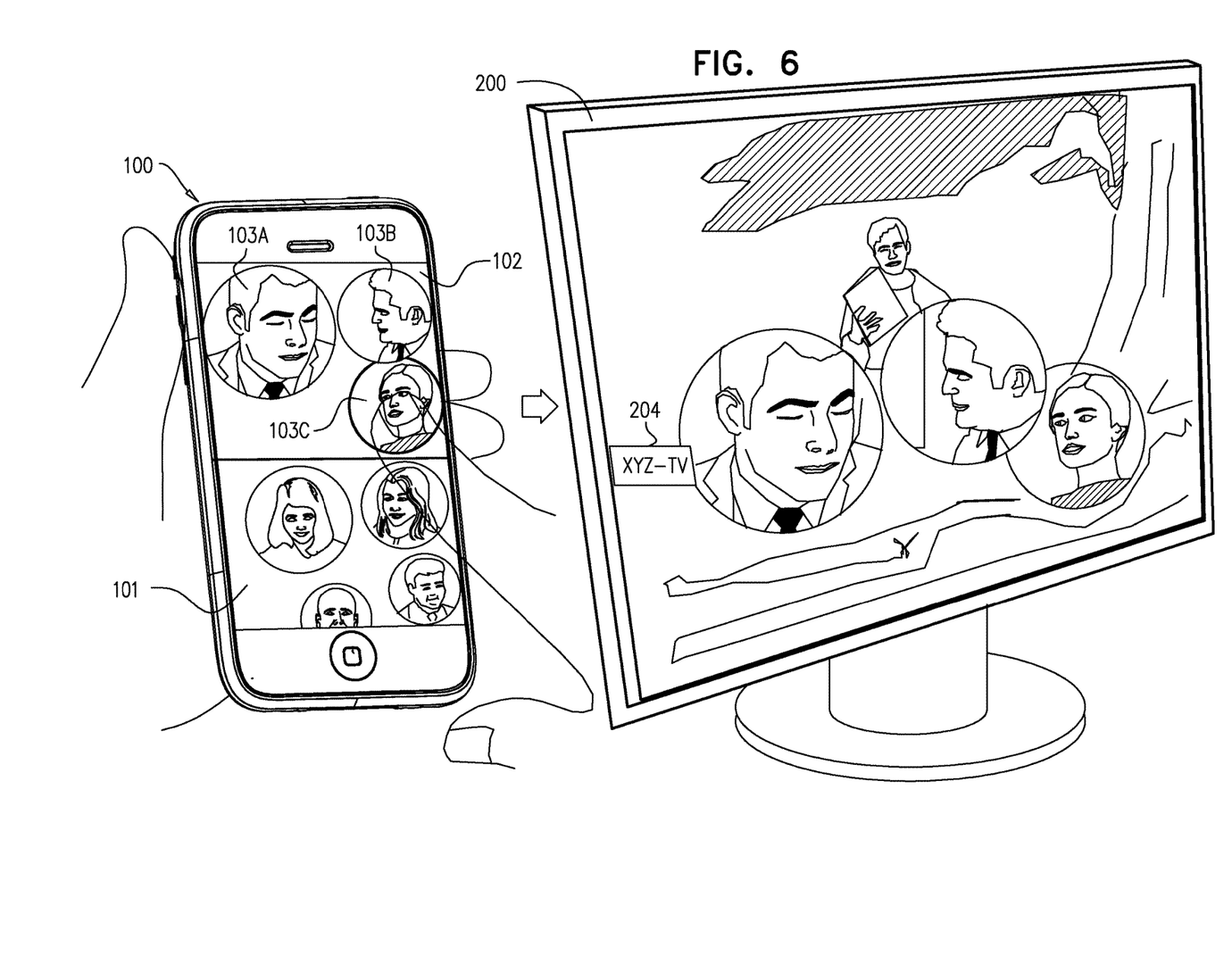

FIG. 6, to which reference is now made, continues the exemplary scenario from FIG. 5. The user taps one of current facial images 103 to send a command to primary device 200 as per step 370 of process 300. In the example, the single tap is interpreted to be a request for more information regarding the video channel associated with current facial images 103 A-C. Primary device therefore adds video channel call sign 204 to its display. It will be appreciated that video call sign 204 is the call sign associated with the video channel from which facial image 103C is presently being broadcast, and not necessarily the video channel presently playing on primary device 200.

Figure 7:
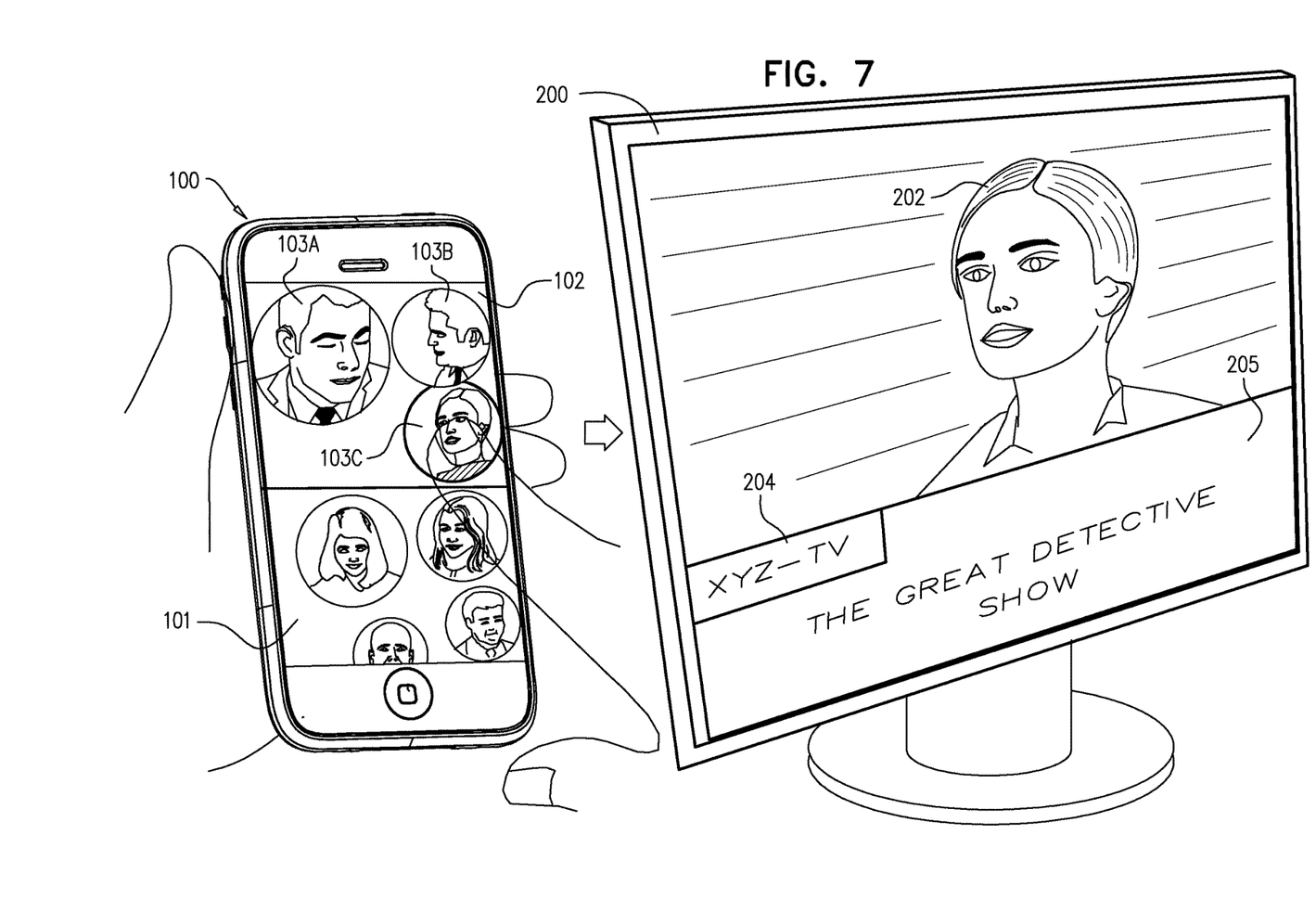

FIG. 7, to which reference is now made, continues the exemplary scenario from FIGS. 5 and 6. The user taps or double taps current facial image 103C. The resulting request sent to primary device 200 is interpreted to expand the associated facial image and move it to the full screen display of primary device 200 per its location in the source video content. For example, facial image 202 as displayed in FIG. 7 may be an expanded representation of current facial image 103C. Primary device 200 also adds program title 205, i.e., "The Great Detective Show" at the bottom of the display. An additional tap, double tap or continued press on companion device 100 may be used to send a request to primary device 200 to begin playing the underlying media content from the associated video channel.

In accordance with embodiments disclosed herein, when a facial image 103 is selected by tapping or long-pressing on companion device 100, the corresponding facial image as displayed on primary device 200 may dynamically animate and migrate to its original relative frame location. For example, the facial image corresponding to facial image 103C on FIG. 6, has migrated to become facial image 202 in FIG. 7, and is now located as per its location within the original source frame in which it was detected by face detection server 30. Additionally, the other elements of the frame may fade in 'around' facial image 202 until the entire original frame is displayed.

It will be appreciated that the use of specific user interface (UI) methods such as tapping, double tapping and continued pressing may be exemplary. The present disclosure may support the use of any suitable UI methods to navigate between video channels, select individual current facial images 103, and/or to receive and send requests to primary device 200. It will similarly be appreciated that the present disclosure supports alternative combinations of the features disclosed with regard to FIGS. 5-7. For example, different UI gestures or combinations of UI gestures may be used to request the display of video channel call sign 204 and/or program title 205. Similarly, primary device 200 may configured to provide some or all of the disclosed functionalities autonomously with requiring explicit UI gestures for each request.

It will be appreciated by a person of skill in the art that while the embodiments disclosed hereinabove have been generally discussed with reference to the selection of channels in a broadcast television system, other sources of video content may be equally supported. Specifically, the hereinabove embodiments may be understood in generally the same manner to support the selection of content in a VOD catalogue and/or other repository of video content. It will be appreciated that process 300 would provide generally the same functional utility when used with such alternate sources of video content; i.e., connecting viewers with video content based upon their cognitive ability to process human faces quickly and intelligently.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for selecting video channels, the method implemented on a computing device and comprising:
   receiving at least one set of detected facial images, wherein said detected facial images were detected from source facial images in video content in a current broadcast of a multiplicity of said video channels;
   receiving timeline metadata associated with said detected facial images, wherein said timeline metadata is derived from said video content;
   detecting interstitial facial images in said at least one set of detected facial images according to said timeline metadata;
   discarding said interstitial facial images;
   presenting video content on at least a part of a display screen associated with said computing device, wherein said video content corresponds to video content currently playing on a video channel playing device;
   displaying said at least one set of detected facial images on at least a part of said display screen associated with said computing device, wherein each of said at least one set is associated with one of said video channels, and said displaying comprises superimposing a display of said at least one set of detected facial images on top of said video content in temporal alignment with said associated source facial images according to said timeline metadata as said source facial images appear in said video content in said current broadcast;
   detecting user selection of a selected set of detected facial images; and
   sending a video channel switching command to said video channel playing device, wherein said video channel switching command indicates a switch to said video channel associated with said selected set of detected facial images.

2. The method according to claim 1 and also comprising:
   detecting user entry of a scroll command; and
   scrolling said displayed at least one set of detected facial images on said display screen in a direction indicated by said scroll command.

3. The method according to claim 1 and also comprising:
   generating said at least one set of detected facial images by associating said detected facial images with individual said video channels in accordance with said timeline metadata.

4. The method according to claim 1 and wherein said computing device and said video channel playing device are configured as a single device.

5. The method according to claim 1 and also comprising:
   providing at least one said set of detected facial images to said video channel playing device.

6. The method according to claim 5 and also comprising:
   providing said timeline metadata associated with said at least one set of detected facial images to said video channel playing device.

7. The method according to claim 3 and wherein said associating comprises:
   limiting a number of candidate detected facial images to be included in each of said at least one set in accordance with a configurable limit;
   prioritizing said candidate detected facial images for inclusion in each of said sets according to at least one: continuity of appearance, frequency of appearance, user preferences, overall audience viewing preferences, or significance of role; and
   in accordance with said prioritizing, selecting from among said candidate detected facial images for inclusion in said at least one set.

8. The method according to claim 1 wherein said multiplicity of video channels are associated with at least one of video-on-demand content or scheduled content provided by a television broadcaster.

9. A computing device comprising:
   a display screen;
   an I/O module operative to:
      receive detected facial images, wherein said detected facial images correspond to source facial images in video content in a current broadcast of a multiplicity of video channels;
      receive timeline metadata associated with said detected facial images, wherein said timeline metadata is derived from said video content in a current broadcast of a multiplicity of said video channels;

a processor; and a channel selector to be executed by said processor and operative to:
- detect interstitial facial images in said detected facial images according to said timeline metadata;
- discard said interstitial facial images;
- display at least one set of said detected facial images on at least a part of said display screen as superimposed on top of said video content wherein each of said set of facial images is in temporal alignment with associated video content currently being broadcast on a video channel from among said multiplicity of said video channels, wherein said temporal alignment is according to said timeline metadata;
- detect user selection of a selected set of facial images; and
- send a video channel switching command via said I/O module to a video channel playing device, wherein said video channel switching command indicates a switch to said video channel associated with said selected set of detected facial images.

10. The computing device according to claim 9 and also comprising:
said video channel playing device.

11. The computing device according to claim 9 and wherein said channel selector is also configured to:
in accordance with said timeline metadata, group said detected facial images into said at least one set of facial images.

12. The method according to claim 1 and wherein said video content in said current broadcast is live content.

13. A system instantiated on a tangible medium on a computing device and comprising:
means for receiving at least one set of detected facial images, wherein said detected facial images were detected from source facial images in video content in a current broadcast of a multiplicity of said video channels;

means for receiving timeline metadata associated with said detected facial images, wherein said timeline metadata is derived from said video content;

means for detecting interstitial facial images in said at least one set of detected facial images according to said timeline metadata;

means for discarding said interstitial facial images;

means for presenting video content on at least a part of a display screen associated with said computing device, wherein said video content corresponds to video content currently playing on a video channel playing device;

means for displaying said at least one set of detected facial images on at least a part of said display screen associated with said computing device, wherein each of said at least one set is associated with one of said video channels, and said displaying comprises superimposing a display of said at least one set of detected facial images on top of said video content in temporal alignment with said associated source facial images according to said timeline metadata as said source facial images appear in said video content in said current broadcast;

means for detecting user selection of a selected set of detected facial images; and means for sending a video channel switching command to said video channel playing device, wherein said video channel switching command indicates a switch to said video channel associated with said selected set of detected facial images.

* * * * *